United States Patent [19]

Lipshitz

[11] Patent Number: 5,125,746
[45] Date of Patent: Jun. 30, 1992

[54] SURFACE TOPOGRAPHY MEASUREMENT APPARATUS AND METHOD

[76] Inventor: Harold Lipshitz, 348 Baldwin Rd., Carlisle, Mass. 01741

[21] Appl. No.: 535,017

[22] Filed: Jun. 7, 1990

[51] Int. Cl.⁵ .......................................... G01B 11/24
[52] U.S. Cl. .................................. 356/376; 356/371; 250/201.3; 358/107
[58] Field of Search ............................ 356/371, 376; 250/201.3, 201.4; 358/107, 106

[56] References Cited

U.S. PATENT DOCUMENTS

| | | | |
|---|---|---|---|
| 4,629,324 | 12/1986 | Stern | 356/376 |
| 4,743,771 | 5/1988 | Sacks et al. | 356/386 |
| 4,844,617 | 7/1989 | Kelderman et al. | 356/376 |
| 4,931,630 | 6/1990 | Cohen et al. | 250/201.3 |
| 4,971,445 | 11/1990 | Sato et al. | 356/376 |

FOREIGN PATENT DOCUMENTS

149815  7/1986  Japan .................................. 356/371

*Primary Examiner*—F. L. Evans
*Attorney, Agent, or Firm*—John M. Brandt

[57] ABSTRACT

This patent describes a mechano-optical non-contact system, and method of use, for characterizing the topography of an area of a surface. The instrumentation consists of an optical system that illuminates a small region of the surface with a focused wedge of light at fixed angle, a magnification system to view the diffuse reflected profile image, a video camera that provides electrical signals corresponding to the profile image, a three dimensional, computer controlled motorized stage, a means for automatically focusing each region of the surface with respect to the optical system, and a computer to analyze and operate on the signal, and record the primary topographical data. The primary data obtained, from which all other parameters derive, are the heights, over an area, as a function of their x,y coordinates in a reference plane (i.e. $z(x,y)$). The system automatically measures the coordinates of points on the surface, at equally spaced intervals, along profiles that can be many times the optical field. Coordinate data for an area are obtained by measuring the coordinates along close and equally spaced profiles within the region.

12 Claims, 2 Drawing Sheets

SURFACE TOPOGRAPHY MEASUREMENT APPARATUS AND METHOD

BACKGROUND OF THE INVENTION

1. Field of the Invention

This invention resides in the field of surface topographical characterization and more particularly relates to a mechanico-electro-optical apparatus and methods of use thereof.

2. Description of the Prior Art

The topography of a material can often affect its usefulness. Surface reactions and interactions of a variety of materials have been shown to vary with roughness. Many examples are cited in the literatures of different fields, relating a variety of phenomena and end use properties to topographic characteristics. These include the literatures of mechanics, fracture mechanics, fluid mechanics, optics, coating, adhesion, machine processing and the biomedical sciences. In addition, the topography of materials has been shown to affect measurements of other surface properties, e. g., contact angle goniometry and reflective spectroscopy.

The importance of topography has therefore resulted in the development of a variety of instruments and procedures to characterize and/or visualize material surfaces. These include instruments for profilometric measurements by stylus and optical means, sequential profilometry by stylus and optical procedures, light and scanning electron microscopy, surface light scattering, thermography and analyses of surface images obtained under angular illumination. A general review of techniques used for quantitative topographic characterization is found in *Rough Surfaces*, ed.

by T. R. Thomas, Longman, N.Y., 1982. Instruments devised for these purposes are described in U.S. Pat. Nos. 3,319,463; 3,322,978; 3,336,833; 3,379,059; 3,543,571; 3,744,304; 3,747,395; 3,908,079; 4,005,932; 4,050,294; 4,145,140; 4,334,282; 4,441,812; 4,498,043; 4,714,348; and 4,732,403.

There are many purposes, however, for which instrumentation, presently known in the art, does not provide sufficient quantitative information or cannot be used on certain materials. For example, while light and scanning electron microscopy are invaluable for surface visualization, their use for dimensional characterization requires specialized time consuming procedures that make quantitative dimensional analyses by these instruments very difficult, if not impossible, to do.

Along the same vein, measurements of the spatial distributions of thermographic data can and are used for topographic characterization. However, this methodology, which assumes a constant proportionality between localized heights above a plane and localized temperature differences between points on the surface and a reference temperature, is not valid when heat conductivity is a spatial variable or when the material undergoes appreciable deformation at elevated temperatures. The methodology is thus limited and not general.

The most commonly used methodology for quantitative topographic characterization has historically been stylus profilometry. In this instrumentation, a stylus traverses a surface while its up-down movement, assumed to follow the surface's profile, is recorded by a displacement transducer and recorder as a function of lateral movement. The methodology requires that the stylus be loaded against the test surface to assure contact.

While stylus profilometry provides quantitative measurements of roughness, its deficiencies are well recognized in the literature. These include the following: (1) test surfaces are often deformed both compressively and laterally as the stylus traverses the surface, making it difficult to uncouple deformational effects from topographic characteristics; (2) Resolution must necessarily be compromised against the average pressure exerted by the stylus; smaller tip radii, permitting greater resolution, results in relatively high pressures on the surface, with consequent increased deformation; (3) Use with high fidelity replicating materials is often unreliable because of the compliant nature of these materials—a serious limitation since replicating materials are often necessary to assess the topographic characteristics of inaccessible surfaces. In addition data obtained from single profiles, i. e., heights, shapes, peaks, and valleys, frequently do not correspond to the actual peaks, etc. of the surface. This deficiency can be circumvented, in part, by sequential traces, digitization, and subsequent statistical treatment, but the limited lateral resolution of stylus profilometry and its primary deficiencies with regard to data acquisition remain.

The aforementioned problems with contact measurements have resulted in the development of optical, non-contact instrumentation. These methodologies include among others: (1) speckle pattern analyses; (2) light section microscopy-permitting visualization of and measurements from reflected profile images; and (3) interferometric optical procedures that enable measurements of surface features to be made. These methodologies are well known to the art and commercial instrumentation using these methodologies are available. However, each of these procedures have some decided limitations.

Speckle pattern analyses, i. e. analyses of measurements of the spatial distribution of scattered light intensities, yields information about a surface roughness through mathematical models of the experiment. Instrumentation using this methodology is described in U.S. Pat. No. 4,145,140. However, the methodology provides neither direct visualization nor measurements of specific surface features. In addition, the methodology is limited to the characterization of relatively smooth surfaces and is unsuited for characterizing low frequency oscillations.

Light section microscopy, as currently available, has the following limitations. The widths of the observed profiles are small, (i. e. equal to or less than 1000 microns) precluding characterization of oscillations greater than that. The reflected image is not sharp even when focused, a consequence of the widths of the illuminating beam and the effects of diffuse and specular scattering. Visual measurements of peak to valley heights from profile images require subjective estimates with uncertainties ranging from 5 to 20 microns and more. The magnitudes of relief profiles that can be measured are limited by the optics of the system, (in practice, about ±100 microns). In addition, single profile lines, as with stylus profilometry, do not provide sufficient quantitative information. In summary, the visualized profiles allow, for the most part, only imprecise determinations of differences in height and distances between oscillations within the profile.

A variation of this methodology is described in U.S. Pat. No. 3,908,079. Here a video camera and analog device is used in combination with a light section microscope to obtain an averaged value of surface oscillations within the microscopic field. This serves as a measure of roughness. While undoubtedly useful, the more descriptive statistical area parameters, requiring discrete field data, cannot be obtained. In addition, surface topographical features cannot be visualized, the value obtained is limited to the microscopic field, and large relief changes cannot be characterized.

Inteference optical systems coupled to a mechanical stage, controlled by computer have recently been used to quantitatively characterize the topography of surfaces. The optical aspects of such a system are described in U.S. Pat. No. 4,732,403. This methodology permits area characterization, has high sensitivity, is non-contact, and allows both visualization and statistical characterization to be made. However, the range of height changes that can be measured is small. The methodology is limited to the characterization of relatively smooth surfaces. The instrumentation cannot detect height changes greater than 15 microns on the outer limit. The methodology is thus not suitable for characterizing many surfaces of interest, e.g. fracture, paper, and biological surfaces that generally have considerably larger height changes.

In contrast to the prior art described above, the present invention addresses itself to the problem of obtaining real, detailed, quantitative dimensional data of surface features by non-contact means, over relatively wide areas, while permitting measurements to be made of both small and large relief changes from 0.25 microns to centimeters. The apparatus and procedures constituting the invention enable measurements to be made automatically of the distances, z, from a reference plane of closely spaced points on a surface as a function of their x,y coordinates in the reference plane. Mappings of surface coordinates z(x,y) are thereby obtained. These, when plotted, yield three dimensional images of surface features that agree very well with scanning electron and light micrographs of the same regions. Mathematical operations on z(x,y) yield any number of descriptive and statistical parameters that cannot readily be obtained by other means for such a wide range of relief characteristics. Finally, the derived statistical parameters and the images seen visually are from the same data set. The calculated parameters depend only on the coordinate measurements and not on theory.

The invention additionally differs from the above described devices in one or more of the following ways. Relatively large areas of varying relief characteristics can be characterized as opposed to single line profiles, by non-contact means. The size of the characterized area is not restricted to the optical field. The data or coordinates obtained permit both the visualization of surface features and dimensional characterization and the obtaining of descriptive statistical parameters from the same region. Both low and high frequency oscillations can be characterized. Any type of material can be analyzed regardless of compliance, and data acquisition can be totally automated.

In addition to topographic characterization, the system can also be used to measure the spatial distributions of the reflectivities of a material, the overall dimensional characteristics of microscopic objects, and the rates of dimensional change of materials, over wide ranges, in real time.

SUMMARY OF THE INVENTION

The invention may be summarized as a method and apparatus for determining the topographical characteristics of a surface wherein a reflecting image magnification optical system provides means such as, for example, a light section microscope, for visualizing, incrementally and sequentially, diffuse surface profiles of small regions (from 1 to 2 microns to 1000 microns) of a test surface. The optical system is coupled with a computer controlled, precisely positionable three dimensional stage and a video system which are operational by an appropriate program to provide data acquistion and processing. The combination of these components increases the precision, overcomes the limitations, and extends the capabilities of the optical system alone. The total resultant system permits measurements to be made of the type described above.

As stated, the data obtained from each profile are the heights, z, from a designated reference plane, of closely spaced points on the test surface, as a function of their x,y coordinates in the reference plane. i.e, z(x,y). The system tabulates the coordinates of points along the profile and fixes their position in real space, with respect to an external axis system.

To further describe the data obtained we designate the tabulated coordinates of the first profile or segment thereof as $Z\{1\}(X,Y\{1\})$ for a fixed $Y\{1\}$ ($Z\{1\}(X)$ are the distances of equally spaced points along the profile from the reference plane as a function of X and $Y\{1\}$, a constant coordinate of all points on that profile.

The sample is then precisely repositioned along the X axis where the distance between the last coordinate recorded from the first profile and the first coordinate recorded from the new profile is the same distance as the distance between coordinate points obtained along the first profile. We designate the recorded coordinates of the second profile as $Z\{2\}(X,Y\{1\}$. Data for $Z\{1\}+Z\{2\}$ thus constitutes a field that is twice as long as that seen in the microscope. Extending the process N times results in the recording of segment coordinates of a profile line, N times the length of that of the microscopic field whose coordinates are recorded at any one time. The process requires that there be precise, exact coordination of stage movements with the distances obtained optically, to assure that there is no gap in information when profile lines are joined.

The sample is now precisely repositioned to Y2, where Y2 is a small fixed distance from Y1 on the Y axis, and the process repeated. A set of values for two closely spaced profile lines is thus obtained and $N^1$ repetitions of the process, with distances between rows constant, results in the tabulation of coordinates for an area $N^1$ (Y2-Y1) by N(Xn-X1). The total set of values thus constitutes coordinate data for the scalar field that can be represented by the matrix Z(X,Y). All statistical, dimensional, and pattern parameters, used for quantitative topographical characterization, are derived from operations on this set of data.

The advantages and features of the invention will be more fully understood from the description of the preferred embodiment and drawings which follow.

DESCRIPTION OF THE PREFERRED EMBODIMENT

Figure 1:
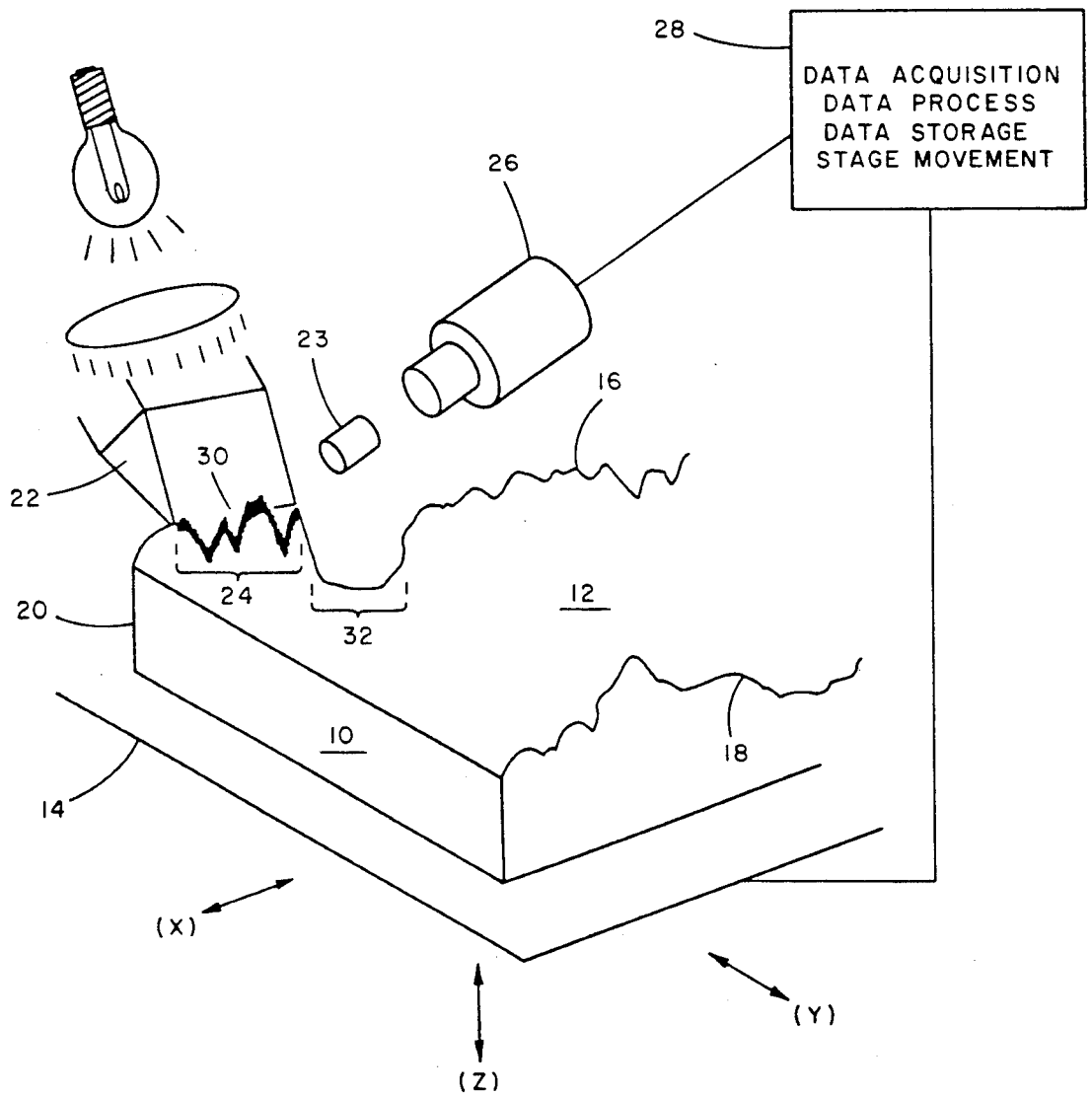
FIG. 1 is a schematic representation of the system of the invention.

Referring first to FIG. 1, a schematic diagram of the system of the invention is illustrated. Test specimen 10 having upper surface 12 is above a stage 14. Orthogonal coordinates x, y, and z are as indicated. A profile of the surface for a selected y is shown at 16 and another at 18. In determining the topographical characteristics it is necessary that one not only procure a reflected image of the profile of the surface but to determine the relative heights of points along that profile for a particular y, a distance z above plane 14, shown as 20. This is accomplished by the invention by illuminating the surface by for example a wedge of light 22. An optical system such as that used in light section microscopy or similar system able to focus a narrow beam of light on the surface, at a fixed angle can be used to illuminate that region of the surface. The reflected part of profile image, having a length 24 is viewed through optical system 23. The angle made between the line of observation and the surface plane is identical to that made by the average angle of the illuminating beam and the same surface. It should be understood however that while the optical system of light section microscopy, which illuminates and views the surface at a 45 degree angle, provides a convenient means to accomplish this purpose, it is not necessary for the purposes of this invention to restrict illumination and viewing to that angle. Further the width of the illuminated region need not be the same as that used in light section microscopy.

The image obtained is viewed through a microscope attached to a video camera 26 and the resulting output passed through a computer 28 where the image is analyzed to determine whether or not it is in focus. Focus is the condition where the distance between the mean value of all usable points and the objective lens equals the focal length of the lens. If not the relative position of the surface and optics is changed to eliminate the focus deviation resulting in a measurement of the distance 20. The distance, up or down needed to bring the surface into focus is recorded by the computer and is part of the measurement of the distance 20. The configuration of the profile 30 and its ascertained heights above the reference plane are then recorded as data points, within the memory of the computer for example, and the specimen moved by computer command to stage 14 to the next field segment 32. The process is repeated over and over until all of the desired surface has been analyzed.

In practice, the profile image produced by the video camera will be somewhat diffuse as indicated at 30 due to scattering and other optical conditions. The computer is therefore needed to refine the image to single values of z by operating on the data spread as it appears from the camera.

Figure 2:
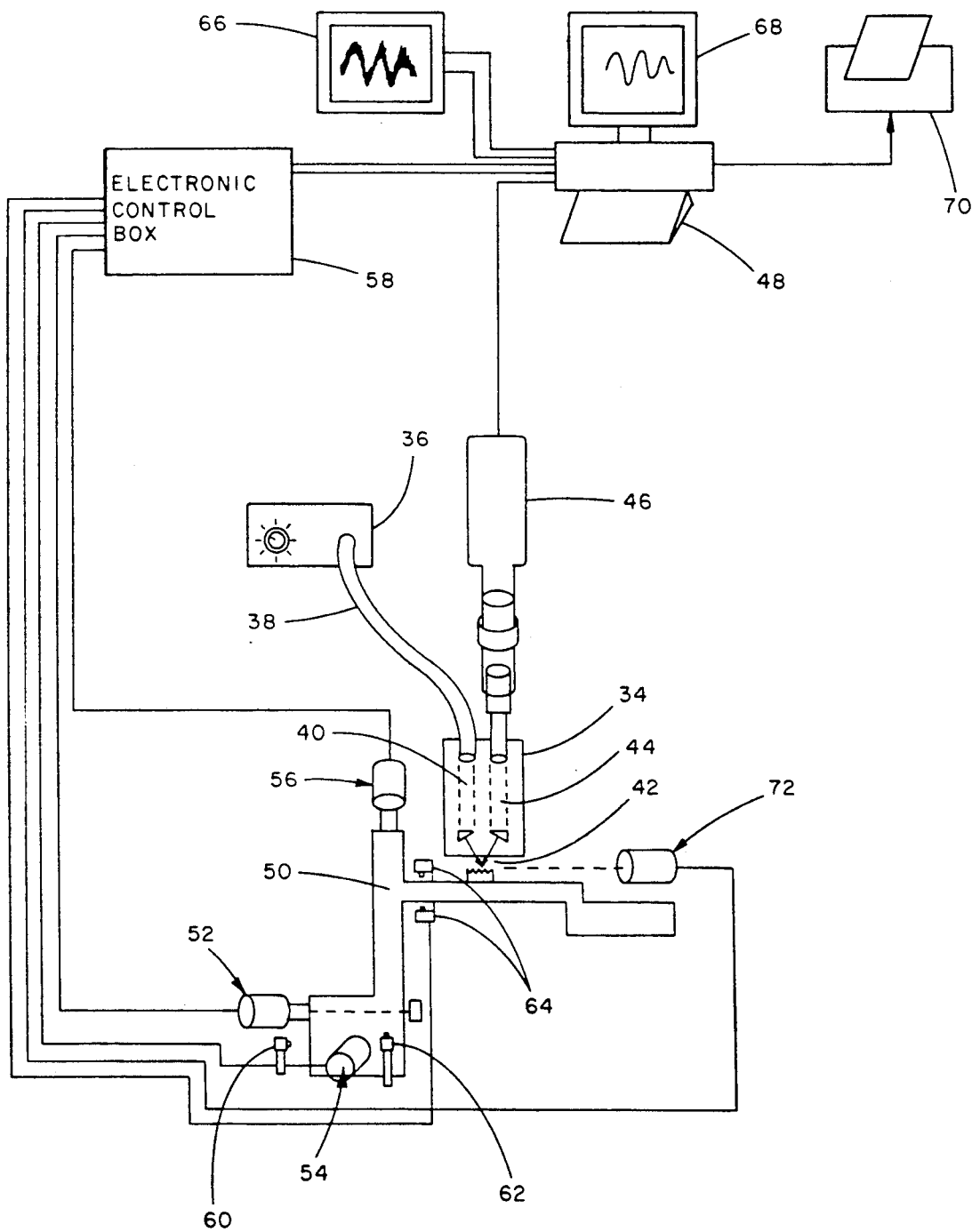
FIG. 2 is a pictorial representation of the apparatus employed to carry out the method of the invention.

Referring next to FIG. 2, the specific apparatus of the invention suitable for carrying out the novel method of surface measurement further described in detail below is pictorially illustrated. A reflecting image magnification system 34 that can comprise for example a light section microscope is illuminated by light source 36 and fiber optic shaft 38 such that the reflected image profile image is of sufficient intensity. Illuminating optics 40 provides a wedge of light focused on sample surface 42. Imaging optics 44 receives the reflected profile surface image of a narrow diffuse line segment of the test surface positioned at 42. Video camera 46 views the image through a magnifying system focused by optics 44 and transmits an electrical output signal to computer 48, for example, an IBM-PC-AT equipped with a monochromatic frame grabbing imaging circuit board capable of measuring 256 levels of light intensity.

A stage 50, moveable by stepping motors 52, 54, and 56 in the x, y and z directions respectively supports the test specimen. The operation of the motors is controlled by computer 48 through control box 58 containing appropriate relay circuitry, and a power source as would be known to those skilled in the art. Limit switches 60, 62 and 64 limit the direction of travel of the stage in the x, y and z directions respectively and defines the origin, reference plane and axes to which all measurements refer, in the extended coordinate system. Finally a video monitor 66 may be added in order to visually observe the image generated by camera 46 and peripheral computer equipment such as monitor 68 and printer 70 allow visualization and printed output of the original and processed data recorded within the memory of the computer.

Procedures Used

The procedure used to perform the method of surface measurement of the invention with the above disclosed apparatus is now described. The process of data acquisition i. e. the obtaining of the surface coordinates is as follows:

Determination of the X, Y Coordinates

Prior to the start of measurements, the stage is moved to limit positions, fixed by the limit switches. These assign the position of the origin in free space, the reference plane, and the orthogonal axes referred to as the external coordinate system. The limit switches stop movement by the driving motors when electrical contact is made. (Their action is such that the positions are known to within 0.2 of a micron).

The X, Y, external laboratory coordinates on the test surface are determined by the distances the stage moves from the initial starting point. These differ by two constants from a point on the stage, one for each direction. The distances the stage moves in the vertical direction from the initial starting point is part of the procedure for determining the heights at the surface above the reference plane. These likewise differ by a constant from a point on the stage. Data acquisition of each row is programmed to begin at the same X value with respect to the external coordinate system. In so doing, the coordinates of precise rectangular regions on the test surfaces are defined.

Stage movement is effected by fine pitched screws. For example, in a system constructed in accordance with the invention, one revolution of each screw moves the stage 40 microns. Finer or coarser screw arrangements can, of course, be used. Each revolution is divided into 200 steps. Hence each step corresponds to a movement of 0.2 of a micron. Computerized recording of the number of motorized steps taken in each direction determines the distance moved.

As stated the stage is precisely positionable in each orthogonal direction in increments of 0.2 microns. However, because of inertial effects, small incremental movements cannot be done directly. To effect such small movement it is necessary that the stage be moved back a certain distance, around 5 microns, prior to its being moved forward to the exact, desired position. To assure that positions attained in the orthogonal system are precisely those programmed for, recorded positions are calibrated against external standards.

The position of a rectangular region on the surface is defined by the external coordinates of its upper left hand corner in the system. This is always the first point of the first surface profile. This can be redefined as the origin of the X,Y axes for that region of the surface. The new X,Y axes, i. e. on the sample, are parallel to the laboratory external axes. Again, the stage is programmed to begin each sequential trace along the Y axis at that X value.

The X at a given value of Y coordinates of equally spaced points along the curve are assigned by means of the rectangular video grid system of the camera and monitor. In our system this is a field of 256 by 512 lines i. e. 256 by 512 pixels. Obviously finer or coarser grids can be used. Calibration curves are employed to relate pixel positions to real distances in microns. When the surface profile curve is imaged on the grid, the computer typically records the coordinates, i. e. the actual heights, of 256 equally spaced points along every surface profile curve.

Determination of the Z Coordinates

Rapid determination of the Z coordinates along a surface profile line and their proper assignment in the X,Y,Z coordinate grid requires that: (1) each profile image be automatically focused prior to data acquisition; (2) the distances moved to bring the image to focus be added to or subtracted from those obtained optically and (3) multiple values of Z(X) for each Y as produced by the optical system due to scattering, be reduced to single valued functions of X.

In the specific system disclosed herein, automatic focusing is based on the finding that the profile images are optimally focused when their mean pixel value is positioned on a predetermined raster of pixels on the video monitor, the specific raster being dependent on the position of the video camera.

This is experimentally established as follows. The microscope is visually focused on a flat polished surface with the camera fixed in position. The reflected image, in this case a straight line, will always be found on the same raster, regardless of sample thickness. This may be termed the focal point raster. The same result is obtained for rough surfaces but optimum focus is attained when the mean average of the focused profile is on the same raster i. e., when the integrated areas above and below the designated raster are equal.

These findings provide an electronic criterion for focus, independent of visual observation. Optimum focus of each profile is thus attained by moving the sample by moving the stage, either up or down to positions where their means lie on the focal point raster.

The procedure for automatic focus therefore consists of employing a computer to (1) calculate a profile image's mean pixel value prior to data acquisition; (2) determine the required distance necessary to move the sample such that the mean is on the focal point raster; (3) calculate the number of motorized steps needed to do this; and (4) effect movement. During data acquisition, this sequence must be followed for every segment of the each total profile line. As stated the distances and directions moved for focusing, from the initial starting point, are added to or subtracted from the heights determined optically. As such, the magnitudes of relief changes that can be quantitatively determined, are not limited by the optics of the system but only by the distance the stage can be moved in the vertical direction.

In the system described herein, the reflected profile images are always somewhat diffuse for reasons of optical imperfection. Thus the line profiles, without data reduction, are broad covering many pixels at each point, i. e., the unprocessed image have multiple values of Z(X) at each X. The reflected line images exhibit a spectrum of light intensities across each raster. While each raster has a point or region of maximum intensity, the maxima as well as the integrated intensities of every raster are variable. Hence simple threshold criteria to identify representative single valued lines across the profile are precluded. An averaging procedure for each raster is therefore preferably used to reduce the broad profile lines to sharp, single valued functions.

The procedure is as follows. A computer computes the weighted average of all pixel positions having light intensities midway between the maximum and baseline. The same program is used to calibrate the images of primary standards. The intensity-position curves are almost always symmetrical for the upper half regions of the intensity spectra of each raster. Thus the weighted averages identify single positions or values at each point that are, for the most part, independent of the breadth of scattering, i. e. the breadth of the line. The weighted average positions of each raster are related, via calibration, with identified heights. Thus this procedure yields profile curves having only one value in each raster and uncertainties in the Z values are eliminated.

This procedure further increases the resolution of the system over that obtainable by the optical system alone. With suitable magnification, differences in height of as little as 0.25 micron can be measured for surfaces of sufficient reflectivity. This cannot be done by visual observation, or in the absence of data processing, alone.

The procedure for calibrating distances between pixels for each magnification is done with precise primary standards. The primary standards, having heights and widths between markings that are independently determined, are used to relate distances between pixels to real distances.

For the Z direction, flat gauge blocs of precisely known thickness are placed on a flat surface on the stage and viewed through the optical system. The pixel position of the sharp flat line across the monitor is recorded by the computer. This raster then serves as a reference point. The reference gauge bloc is then removed and replaced by a slightly thicker one. The pixel position of the new raster is recorded and the process repeated with different blocs. A series of values are thus obtained that linearly relate pixel position-to change in thickness.

Alternatively when screw or stage movement is calibrated against external primary standards, changes in stage position can be used directly to relate changes in pixel position with height change. The procedure is as follows. The optical system-camera assembly is focused on a flat surface and the stage positioned so that the line image of the surface is in the upper half of the screen. The average pixel of the line is noted. The stage is then raised so the line is in the lower half of the screen. The difference between the pixel positions of the two images divided by the number of motorized steps needed to move the image times the actual distance moved per step, yields the change in height per change in pixel position.

Calibration of screw against external standards obviates the need to maintain the apparatus in a constant temperature environment. Expansions and contractions due to temperature are accounted for by calibration.

Similar procedures are used to calibrate changes in the X direction. Here, however, the surfaces of the primary standards have markings of known distance between them. The primary standards are fixed in position and the pixel positions of the markings calibrated against known distances. Here again, calibrated screw or stage movement can be used directly. The method provides for aligning a feature of an image on a prescribed raster. After the position of the stage is noted, the feature is moved to another raster and the number of motorized steps required for the movement determined. From this data, the actual distance per pixel change in the X direction is easily computed.

The addition of a fourth stepping motor attached to the stage enables the system to be used to determine the topographical characterization of non-flat objects.

The procedure is as follows. A stepping motor 72, controlled by the computer board, is secured to the stage. The object, held by a bracket attached to the stepping motor, is programmed to rotate around its axis in steps of approximately 1.4 degrees per step. Between each step the instrument is programmed to scan the profile of the surface for a designated length. As such the sequence of steps are the same as that described for flat surfaces except that in this case the rows of data relate to rotation instead of translation. The coordinates of the surface profiles with respect to the laboratory reference plane are determined for each orientation. From these data, surface characteristic parameters can be calculated in a similar manner as that determined for flat surfaces. However, in addition to surface topographical characteristics, the data also yields measurements of the eccentricities of different regions.

Additionally, it has been found that by varying optical magnification, profile images of greater or lesser detail can be determined by the insertion of auxiliary lenses between the microscope and the camera.

With appropriate programming the system described above may be used to carry out other surface related measurements. For example, the system can be used to determine dimensional changes of surfaces with respect to time. In addition, three dimensional shape parameters and volumes of microscopic objects may be determined. An additional determination that can be made is the spacial distribution of the relative reflectiveness of a surface.

As other uses and modifications of the apparatus described herein will become apparent to those skilled in the art, the invention is hereby defined by the following claims.

What is claimed is:

1. Apparatus for measuring the topographical characteristics of a surface comprising in combination:
   a. a reflective image magnification system;
   b. a stage for supporting said surface in the field of view of said magnification system;
   c. a selected reference plane;
   d. moveable focusing means arranged to adjust the relative position of said surface and said magnification system;
   e. a video camera arranged to view said surface through said magnification system to provide a video output signal corresponding to topographical characteristics of said surface;
   f. a computer arranged to receive said output signal, analyze said signal to determine the deviation of said surface from focus, and to provide an output signal to said moveable focusing means to eliminate said deviation; and
   g. recording means for recording the image and position of the image of said surface with respect to said reference plane generated by said video camera upon achieving said focus.

2. The apparatus of claim 1 wherein said moveable focusing means comprise a stage arranged to support said surface and a stepping motor arranged to move said stage in the vertical direction.

3. The apparatus of claim 1 further including horizontally moveable positioning means to adjust the relative position of said surface and said magnification system to provide for the examination and recording of images of multiple portions comprising an area of said surface.

4. The apparatus of claim 3 wherein said positioning means comprise two stepping motor means arranged to move said stage in orthogonal directions, said stepping motors actuated by said computer.

5. The apparatus of claim 1 further including a video monitor for displaying said surface image.

6. The apparatus of claim 1 wherein said image magnification system comprises a light section microscope.

7. The apparatus of claim 2 wherein the extent of the vertical movement of said stage is fixed by a limit switch connected to said stepping motor.

8. The apparatus of claim 4 wherein the horizontal orthogonal movement of said stage is controlled by a pair of limit switches connected one each to each of said stepping motors.

9. A method of measuring the topographical characteristics of a surface comprising in combination the steps of:
   a. establishing a reference plane to which the height of sections of said surface may be related;
   b. positioning said surface on said plane in the field of a reflecting image profile magnification system;
   c. positioning a video camera to view said surface through said magnification system said video camera producing an output signal analogous to the profile image of said surface;
   d. passing said output signal of said video camera through a computer to determine the deviation of said surface from said reference plane by the deviation of the focus of said surface;
   e. eliminating said deviation by adjusting the relative vertical position of said surface and said magnification system to focus said surface in response to said determined deviation.
   f. recording said profile image and coordinate position of said image of said surface with respect to said reference plane generated by said video camera upon achieving said focus.

10. The method of claim 9 further including the step of sequentially examining and recording the images of multiple portions of said surface by incrementally moving said surface in orthogonal horizontal steps equivalent to the field of view of said magnification system.

11. The method of claim 9 further including the step of displaying said surface image on a video monitor.

12. The method of claim 9 further including the steps of determining heights at each point from the position of the average intensity of the component sections of said image.

* * * * *